(12) United States Patent
Huang (10) Patent No.: US 7,584,920 B2
(45) Date of Patent: Sep. 8, 2009

(54) STRUCTURE OF SHREDDER TRASH BIN

(75) Inventor: Simon Huang, SanChung (TW)

(73) Assignee: Michilin Prosperity Co., Ltd., Taipei Hsien (TW)

( * ) Notice: Subject to any disclaimer, the term of this patent is extended or adjusted under 35 U.S.C. 154(b) by 292 days.

(21) Appl. No.: 11/822,762

(22) Filed: Jul. 10, 2007

(65) Prior Publication Data

US 2008/0156915 A1 Jul. 3, 2008

(30) Foreign Application Priority Data

Dec. 27, 2006 (CN) .................... 2006 2 0175619 U (51) Int. Cl.
*B02C 18/16* (2006.01)
(52) U.S. Cl. .................... 241/285.2; 241/100; 241/236; 220/908
(58) Field of Classification Search ................. 241/100, 241/236, 285.1, 285.2, 285.3; 220/908, 8
See application file for complete search history.

(56) References Cited

U.S. PATENT DOCUMENTS 3,711,034 A * 1/1973 Ehinger ...................... 241/100
2008/0041986 A1* 2/2008 Ko .............................. 241/100

* cited by examiner

*Primary Examiner*—Mark Rosenbaum
(74) *Attorney, Agent, or Firm*—Bacon & Thomas, PLLC (57) ABSTRACT

A trash bin of the shredder consists of an inner bin and an outer bin. When the user inserts the inner bin into the outer bin, a bolt assembly combines the inner bin and the outer bin. An energy storing element of a pushing mechanism stores energy to push the inner bin out. The user can trigger the bolt assembly by depressing or stepping to release the energy stored in the energy storing element. The inner bin automatically jumps out for the user to clean trash paper therein.

6 Claims, 9 Drawing Sheets

STRUCTURE OF SHREDDER TRASH BIN

BACKGROUND OF THE INVENTION

1. Field of Invention

The invention relates to a shredder and, in particular, to an improved structure of the trash bin of a shredder. The invention provides a means for the inner bin of trash paper to automatically eject by depressing or stepping so that the user can remove the trash paper.

2. Related Art

To prevent such documents as legal files, receipts, invoices, credit card numbers, research reports, or personal financial information (e.g., credit card and phone bills) from being released, it is common to destroy them using a shredder. Therefore, the shredder has become an indispensable device for both business and home applications.

As is well known, the action principle of a shredder for shredding paper is to dispose several cutting blades on two rotary shafts with spacers in between. A motor and a gear box are employed to drive the two parallel rotary shafts that rotate in opposite directions. They provide a shearing force on passing paper to cut it into small stripes. According to the mechanical cutting type, shredders can be classified as stripe-cut shredders and cross-cut shredders. In the former case, the cutting blades are disposed regularly on the rotary shafts and cut the paper along the longitudinal direction into long stripes. Each blade in the latter case has several hook-shaped cutting edges. The blades are disposed in a spiral way on the rotary shafts. In this case, the paper is not only cut along the longitudinal direction into stripes, but also cut in the transverse direction into chips.

In the case of either stripe-cut shredders or cross-cut shredders, they are usually sold with a trash basket or bin for accommodating trash paper. The trash bin is usually in a cylindrical shape with an upward opening. The trash bin is disposed inside the shredder. The paper pieces being cut directly fall into the trash bin. When the trash bin is full, it has to be clean in order not to affect the normal operations of the shredder.

SUMMARY OF THE INVENTION

An objective of the invention is to provide a trash bin consisting of an inner bin and an outer bin. The inner bin that accommodates trash paper automatically jumps out for the user to clean using the depressing or stepping means.

According to the above-mentioned objective, the disclosed structure of the shredder trash bin includes an outer bin, an inner bin, a bolt assembly, and a pushing mechanism. A first opening for paper pieces to fall in is formed on top of the outer bin. A second opening is formed on one side of the outer bin for the inner bin to move in and out. The bolt assembly and the pushing mechanism are disposed respectively at the inner bin and the outer bin. When the user inserts the inner bin into the outer bin, the bolt assembly connects the inner and outer bins and stores sufficient energy for pushing the inner bin out in the energy storing element of the pushing mechanism. The user can trigger the bolt assembly by depressing or stepping. The energy stored in the energy storing element enables the inner bin to automatically eject for the user to clean trash paper therein.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
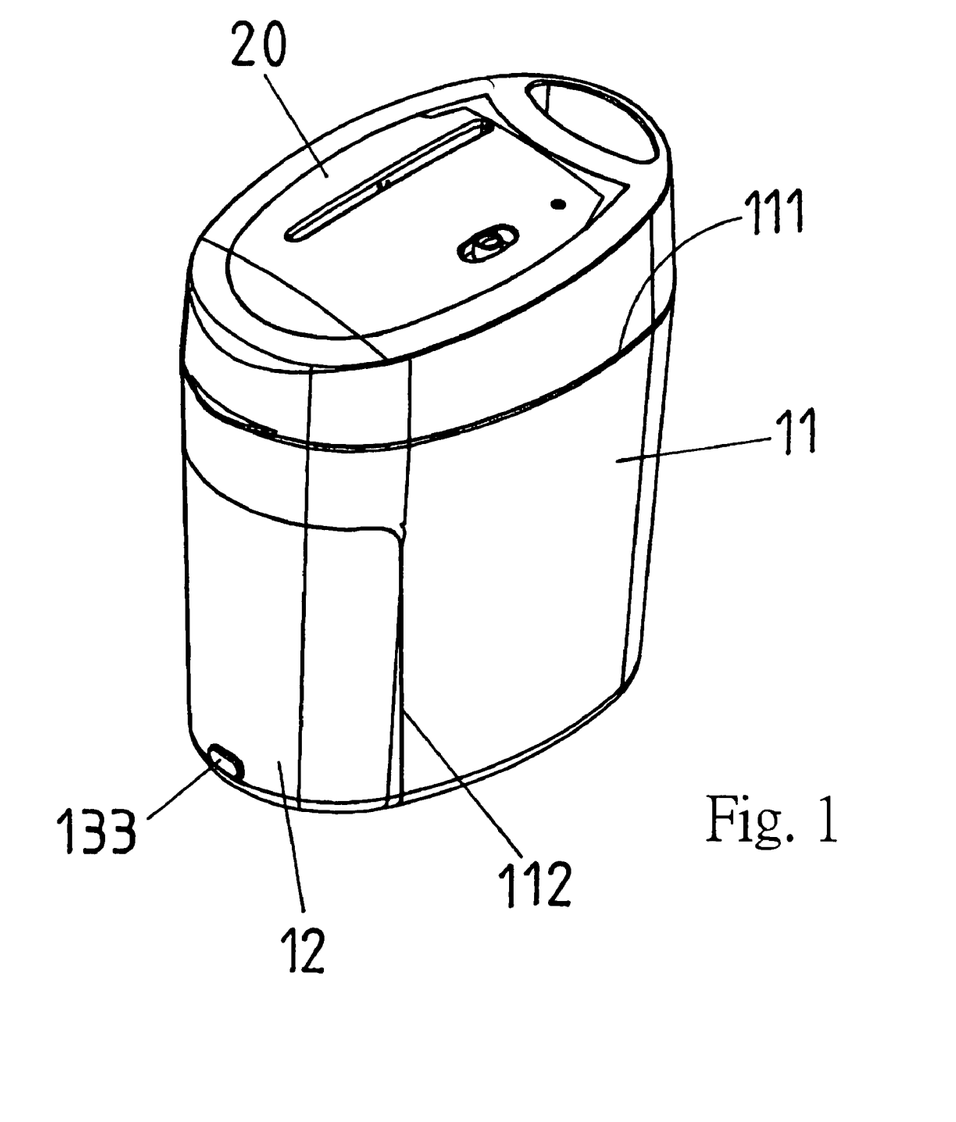
FIG. 1 is a three-dimensional view of the invention.
Figure 2:
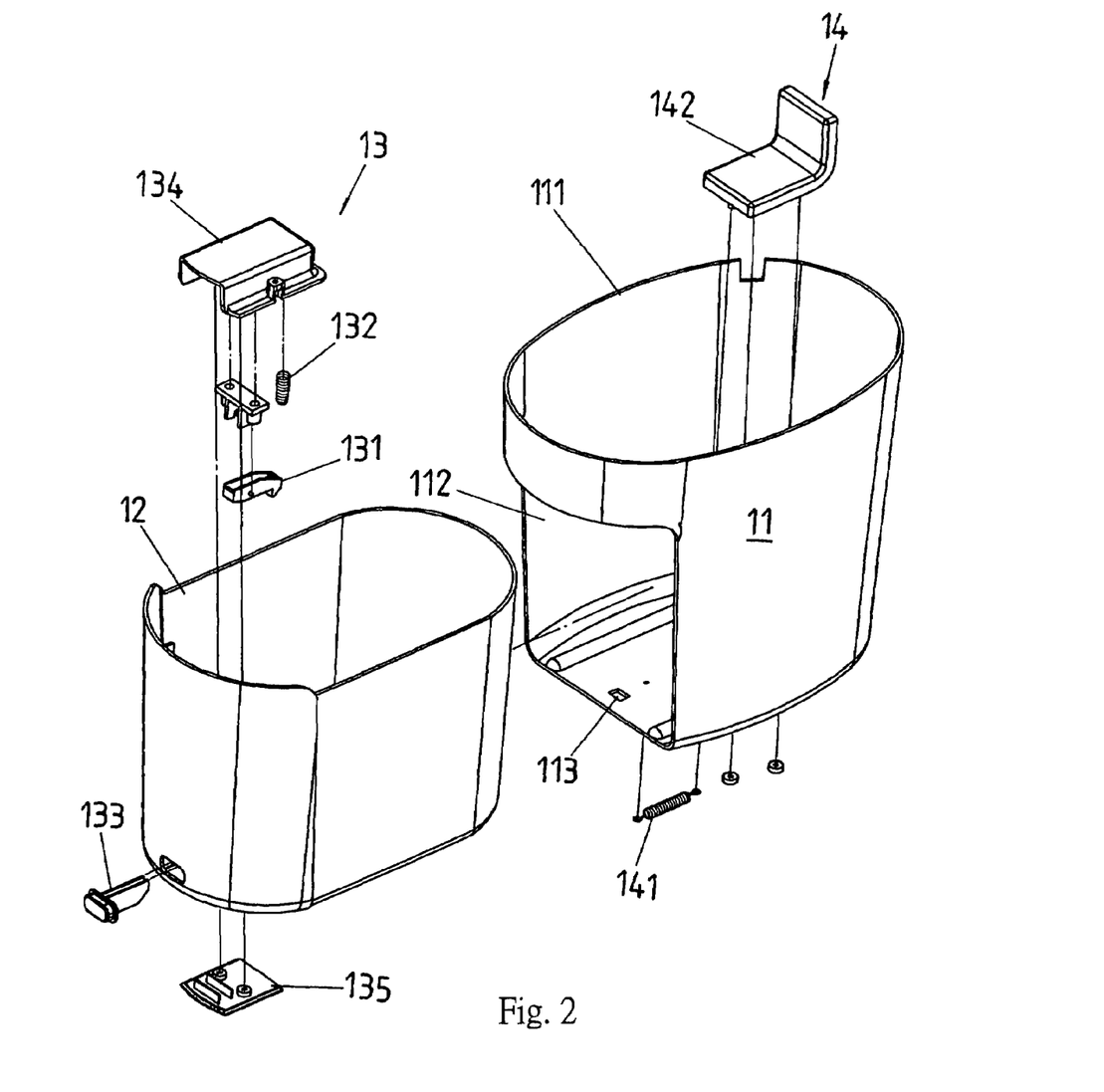
FIG. 2 is an exploded view of the structure of the invention.
Figure 3:
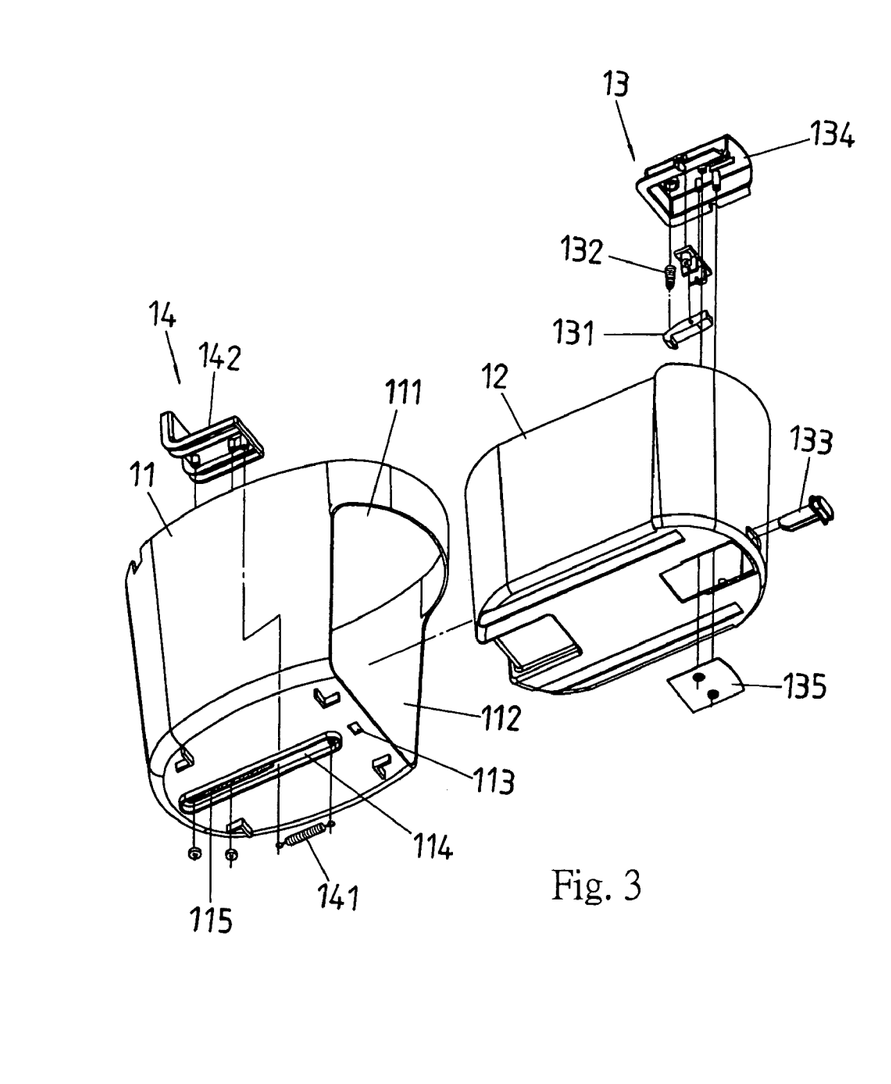
FIG. 3 is an exploded view of the structure as viewed from another angle.

FIG. 1 is a three-dimensional view of the invention. FIG. 2 is an exploded view of the structure of the invention. FIG. 3 is an exploded view of the structure as viewed from another angle.

The disclosed shredder trash bin includes an out bin 11, an inner bin 12, a bolt assembly 13, and a pushing mechanism 14.

The outer bin 11 is used to support the shredder body 20 and to accommodate the inner bin 12. A first opening 111 for paper pieces to fall in is formed on top of the outer bin 11. A second opening 112 is formed on one side of the outer bin 11 for the inner bin 12 to move in and out.

The inner bin 12 is accommodated inside the seconding opening 112 of the outer bin 11 for accommodating paper pieces falling from the first opening 111.

The bolt assembly 13 is disposed inside the inner bin 12 for connecting the inner bin 12 and the outer bin 11. The user can exert a force to release the connection between the inner bin 12 and the outer bin 11.

The pushing mechanism 14 is disposed on the outer bin 11 for providing sufficient energy to push the inner bin 12 out of the outer bin 11. The energy is released by triggering the bolt assembly 13 to remove the connection between the inner bin 12 and the outer bin 11.

Figure 4:
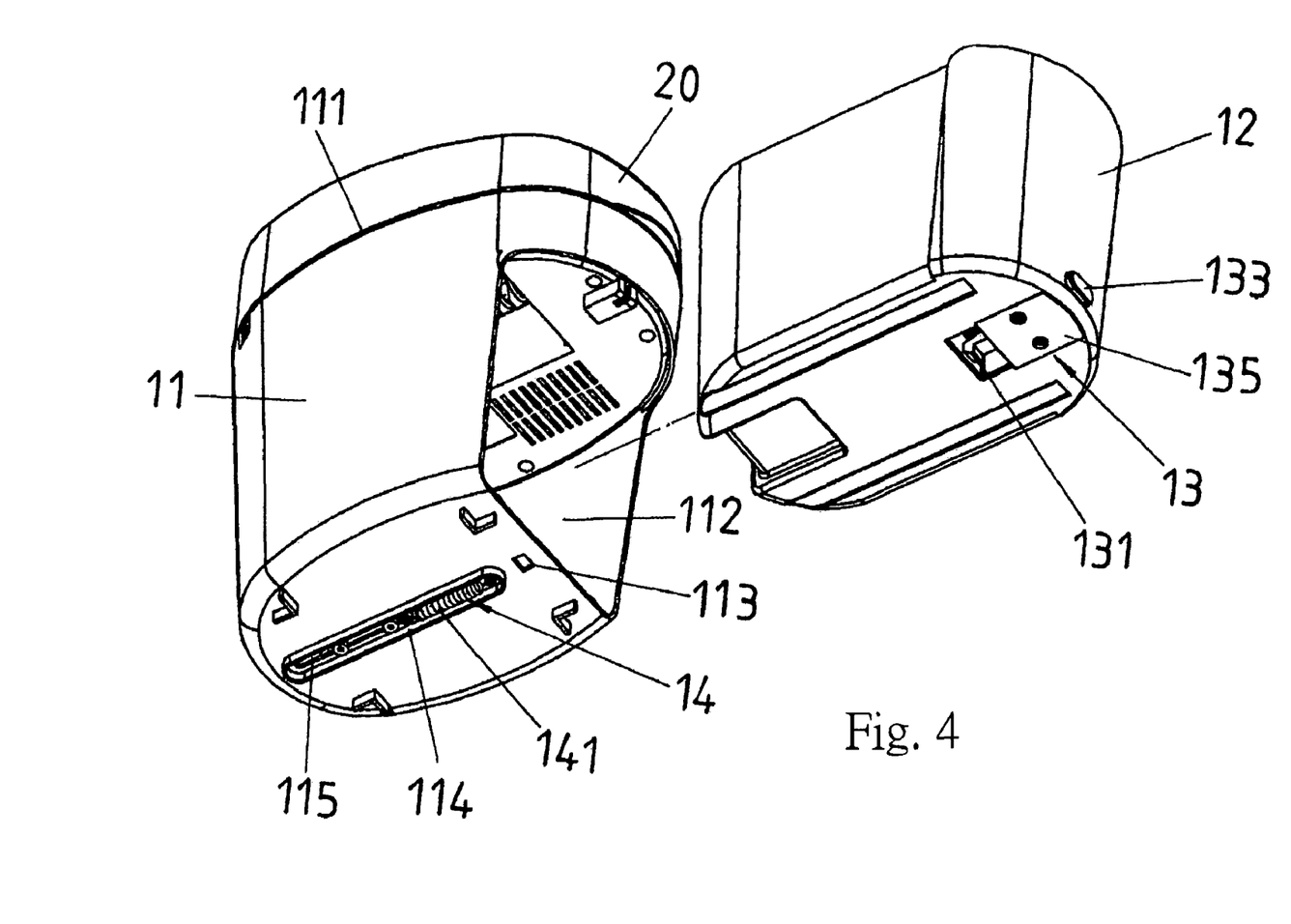
FIG. 4 shows the bottom structures of the disclosed inner and outer bins.
Figure 5:
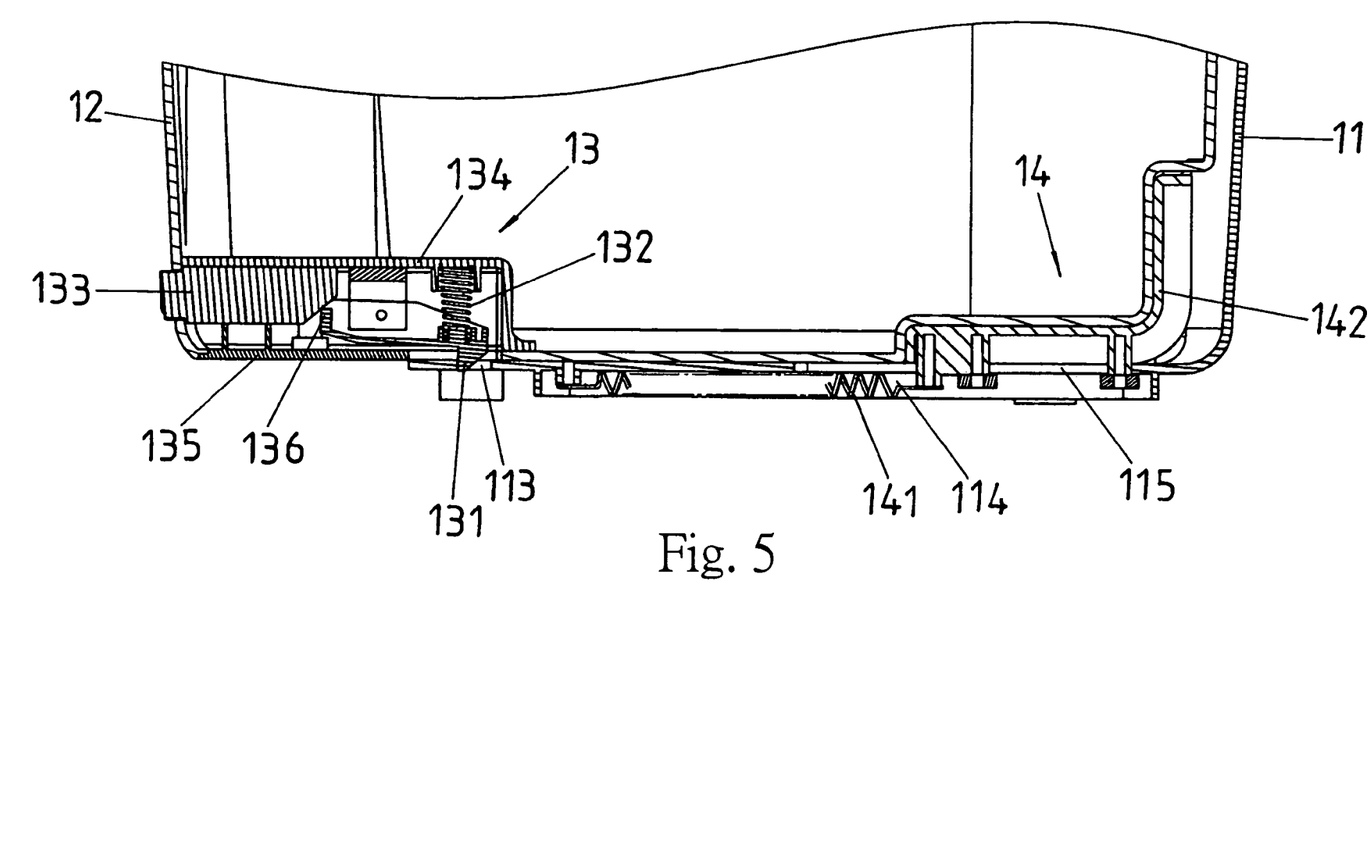
FIG. 5 is a cross-sectional view of the bottom structures of the disclosed inner and outer bins.

FIG. 4 shows the bottom structures of the disclosed inner and outer bins. FIG. 5 is a cross-sectional view of the bottom structures of the disclosed inner and outer bins. In practice, the bolt assembly 13 is disposed on one side of the bottom of the inner bin 12. It consists of a hook 131, a hook spring 132, a trigger element 133, a case 134, and a bottom plate 135. The outer bin 11 has a hole 113 for the hook 131. The entire bolt assembly 13 is the combination of the case 134 and the bottom plate 135. The hook 131 is pivotally disposed inside the case 134. The hook spring 132 is disposed between the case 134 and the inner side of the hook 131 for constantly generating a force that pulls the inner side of the hook 131 toward the bottom of the inner bin 12. The inner side of the hook 131 catches the hole 113 of the outer bin 11. This explains the connection between the inner and outer bins 12, 11.

The trigger element 133 of the bolt assembly 13 is disposed across the case 134 and the outer side of the hook 131. A slant surface 136 is formed on the side facing the hook 131. When the trigger element 133 is pushed inward, the pushing force from the slant surface 136 makes the inner side of the hook 131 retreat into the inner side of the inner bin 12. That is, the inner side of the hook 131 is retreated from the hole 113 of the outer bin 11. This releases the connection between the inner and outer bins 12, 11.

The pushing mechanism 14 includes an energy storing element 141 and a sliding block 142. In practice, the bottom of the outer bin 11 is formed with a cavity 114 for accommodating the energy storing element 141 and a track 115 for restricting the sliding range of the sliding block 142. The energy storing element 141 is basically a stretching spring or some similar spring. Both acting ends of the energy storing element 141 are fixed at the sliding block 142 and the outer bin 11. When the inner bin 12 is inserted into the outer bin 11, the sliding block 142 retreats into the outer bin 11 under the push of the inner bin 12. The energy storing element 141 stores the energy for pushing the sliding block 141 (thus the inner bin) out. Once the bolt assembly 13 releases the connection between the inner and outer bins 12, 11, the inner bin 12 is ejected from the outer bin 11 under the action of the pushing mechanism 14 for the user to remove the trash paper therein.

In the embodiment shown in FIG. 1 to FIG. 5, the trigger element 133 of the bolt assembly 13 releases the connection between the inner and outer bins 12, 11 by pushing it horizontally. Therefore, a button is most convenient for the user to push for ejecting the inner bin 12 from the outer bin 11. Besides, the trigger element 133 of the bolt assembly 13 can be designed as a stepping pad shown in FIG. 6. The inner bin 12 can be ejected from the outer bin 11 in a similar way by stepping on the stepping pad.

Figure 6:
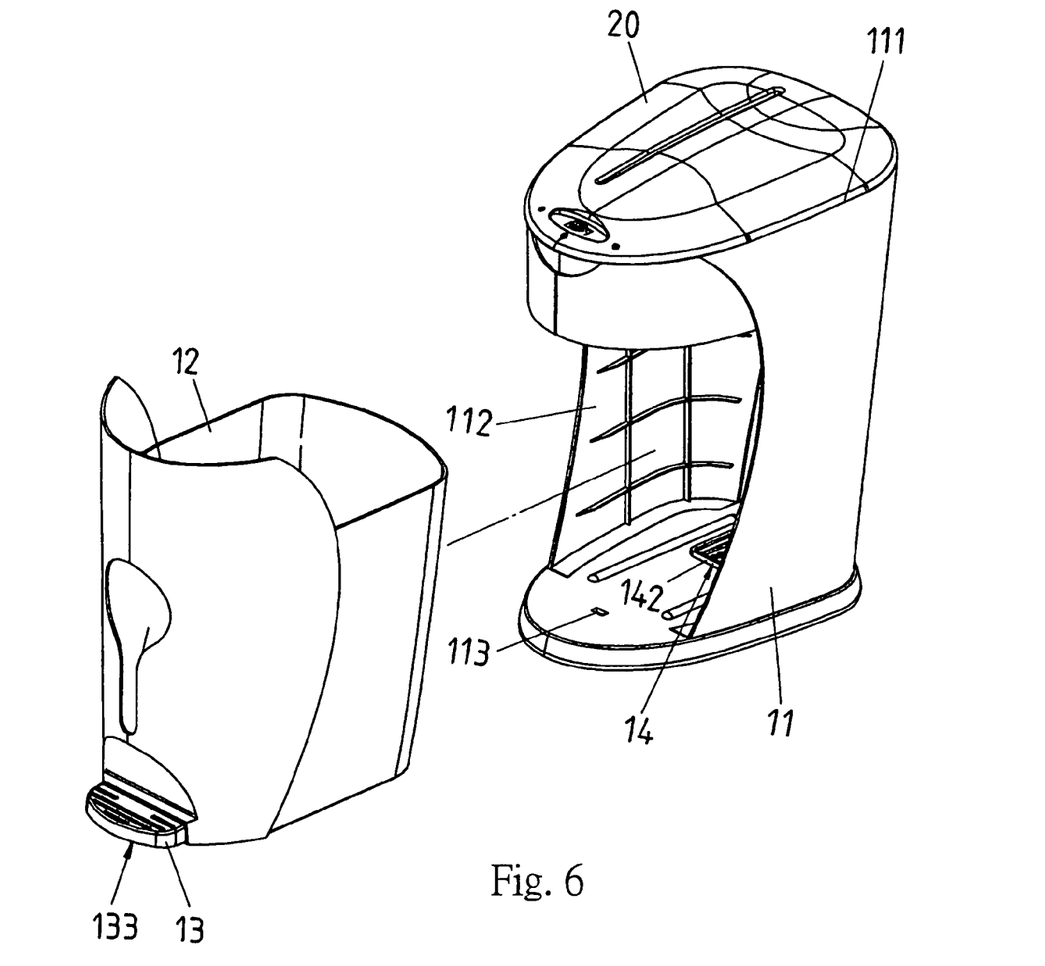
FIG. 6 shows the appearance of the inner and out bins in a second embodiment of the invention.
Figure 7:
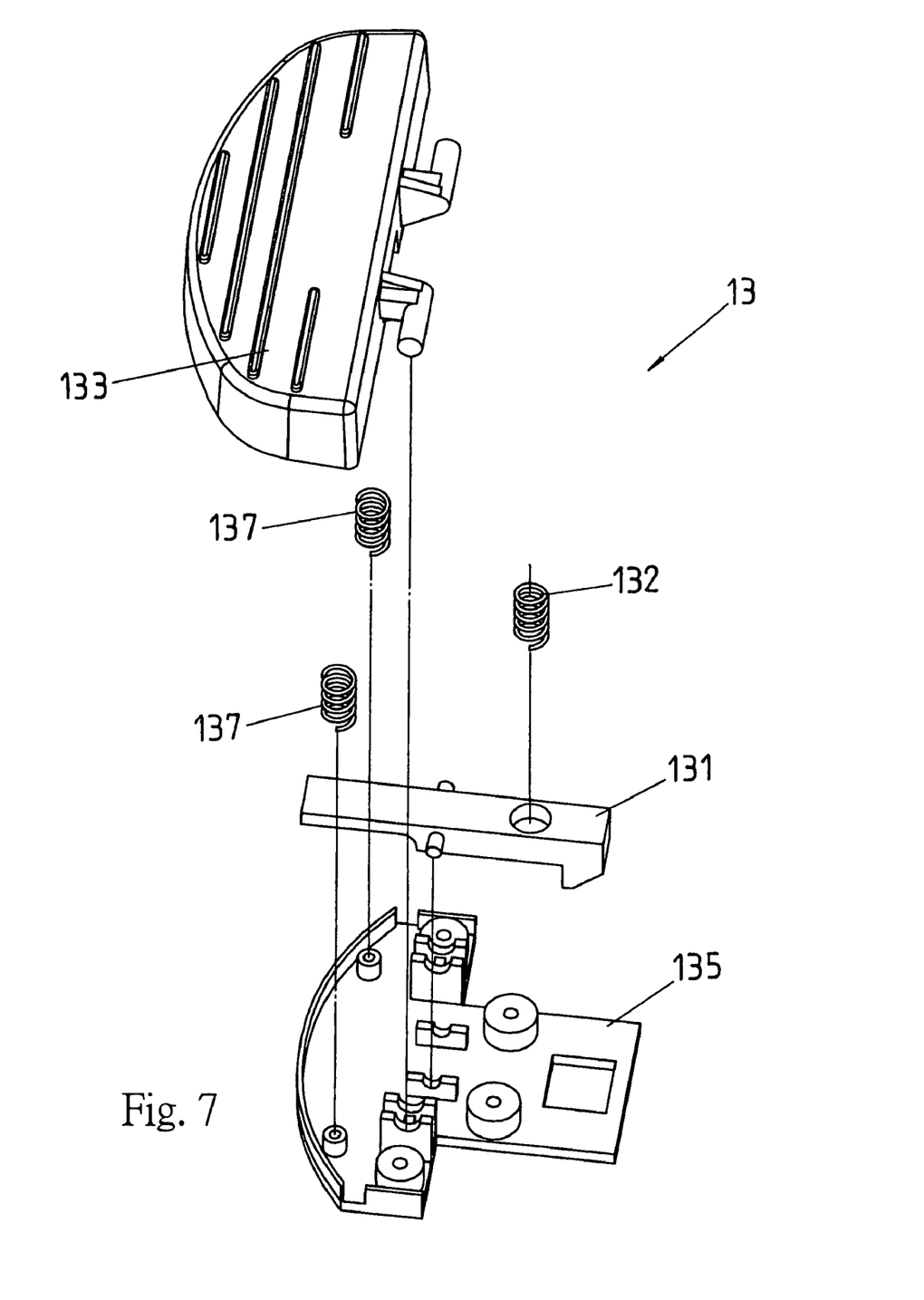
FIG. 7 is an exploded structural view of the bolt assembly in the second embodiment.
Figure 8:
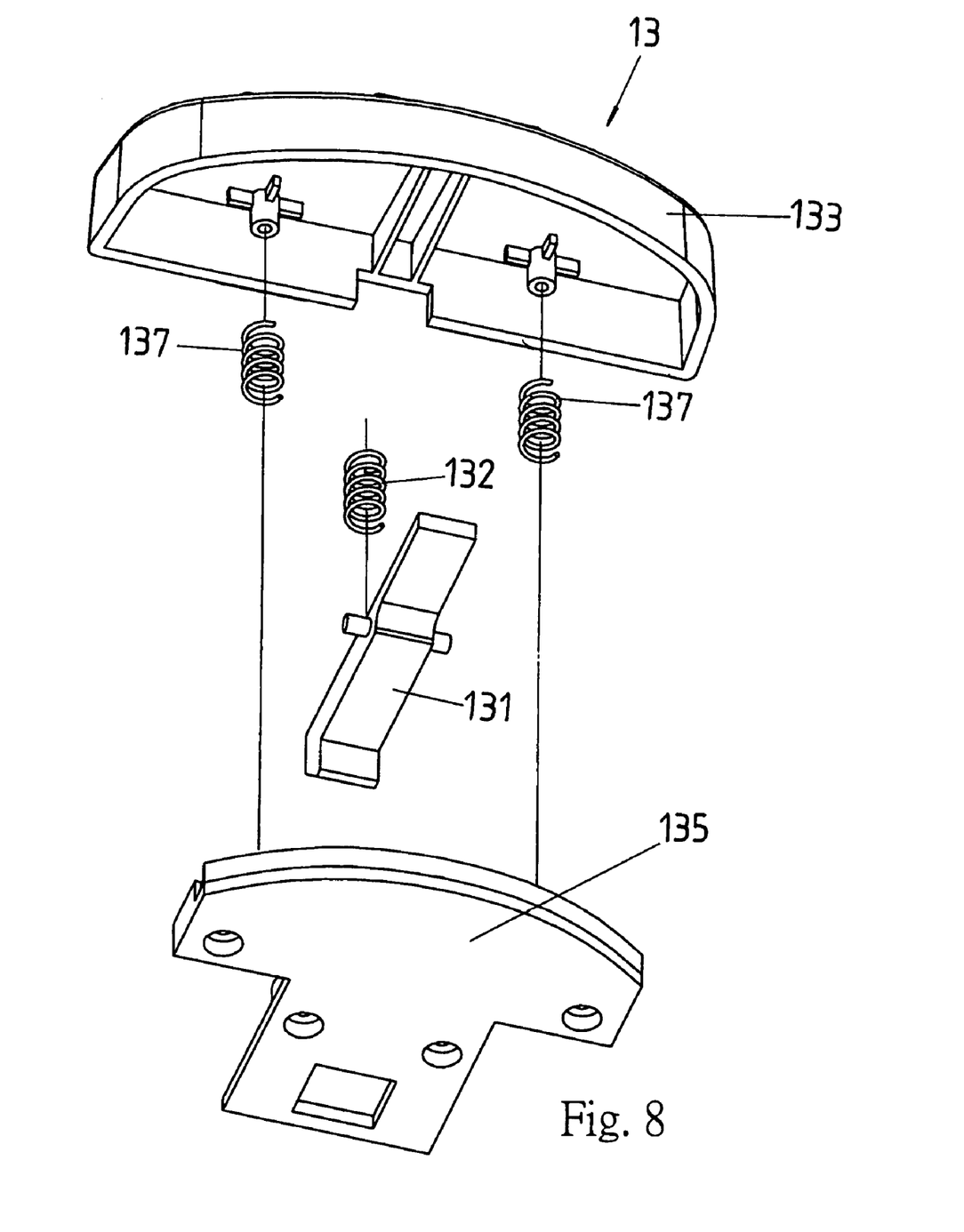
FIG. 8 is an exploded structural view of the bolt assembly in the second embodiment as viewed from another angle.
Figure 9:
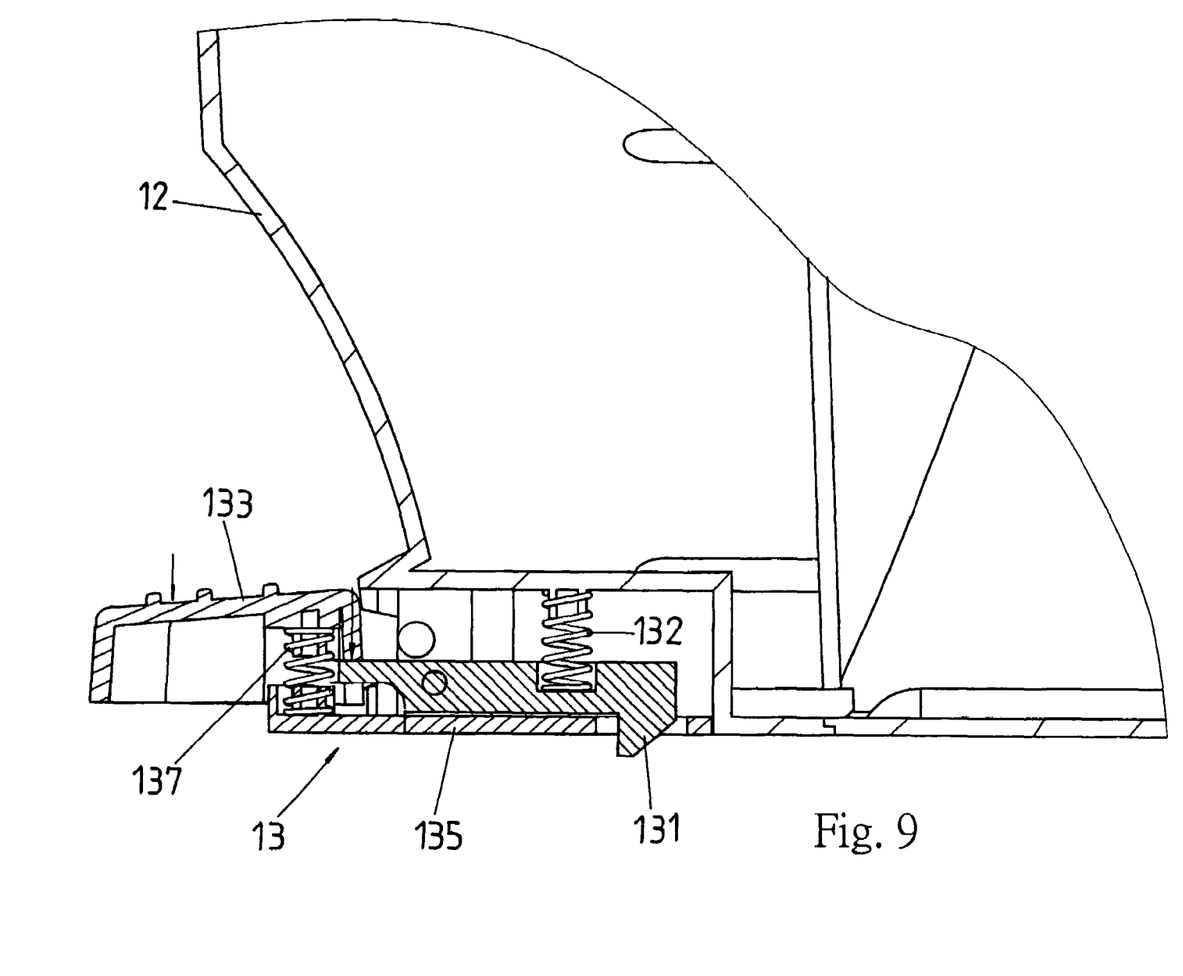
FIG. 9 is a cross-sectional view of the bolt assembly in the second embodiment.

FIG. 6 shows the appearance of the inner and out bins in a second embodiment of the invention. FIG. 7 is an exploded structural view of the bolt assembly in the second embodiment. FIG. 8 is an exploded structural view of the bolt assembly in the second embodiment as viewed from another angle. FIG. 9 is a cross-sectional view of the bolt assembly in the second embodiment.

In this embodiment, the bolt assembly 13 includes a hook 131, a hook spring 132, a trigger element 133, a bottom plate 135, and at least one trigger spring 137. The bottom plate 135 is fixed on the bottom surface of the inner bin 12.

Likewise, the outer bin 11 is formed with a hole 113 for the hook 131. The hook 131 is pivotally disposed between the bottom plate 135 and the bottom surface of the inner bin 12. The hook spring 132 is disposed between the bottom surface of the inner bin 12 and the inner side of the hook 131 for constantly generating a force to pull the inner side of the hook 131 toward the bottom of the inner bin 12. The inner side of the hook 131 catches the hole 113 of the outer bin 11. This explains the connection between the inner and outer bins 12, 11. The trigger element 133 is pivotally disposed between the bottom plate 135 and the bottom surface of the inner bin 12, toward the outer side of the hook 131. When the trigger element 133 is depressed, it touches the outer side of the hook 131 so that the inner side of the hook 131 retreats into the inner side of the inner bin 12. That is, the inner side of the hook 131 retreats from the hole 113 on the outer bin 11, releasing the connection between the inner and outer bins 12, 11. The trigger springs 137 are disposed between the bottom plate 135 and the trigger element 133 for generating a force pushing the trigger element 133 upward. The bolt assembly 13 is thus pushed back to the state for the inner and outer bins 12, 11 to be connected.

In summary, the disclosed shredder trash bin has an inner bin and an outer bin. Using the bolt assembly and the pushing mechanism, the inner bin for trash paper can be ejected by depressing or stepping without manually removing the shredder body from the trash bin. This is very convenient for the user to clean the trash paper therein.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An improved structure of a shredder trash bin, comprising:
   an outer bin, which has a first opening on its top for paper pieces to fall in and a second opening on its side for accommodating an inner bin;
   an inner bin, which is accommodated inside the second opening of the outer bin for accommodating trash paper pieces;
   a bolt assembly, which is disposed in the inner bin for the combination between the inner bin and the outer bin, wherein the connection between the inner bin and the outer bin is released by exerting a force thereon; and
   a pushing mechanism, which is disposed inner the outer bin for providing sufficient energy to eject the inner bin out of the outer bin once the bolt assembly is triggered to release the connection between the inner bin and the outer bin.

2. The improved structure of a shredder trash bin according to claim 1, wherein the pushing mechanism consists of an energy storing element and a sliding block, both acting ends of the energy storing element are fixed on the sliding block and the outer bin, respectively.

3. The improved structure of a shredder trash bin according to claim 2, wherein the bottom of the outer bin is formed with a cavity for accommodating the energy storing element and a track for restricting the range of the sliding block.

4. The improved structure of a shredder trash bin according to claim 3, wherein the energy storing element is a stretching spring.

5. The improved structure of a shredder trash bin according to claim 1 with bolt assembly including a hook, a hook spring, a trigger element, and a bottom plate, wherein the outer bin is formed with a hole for the hook, the bolt assembly is fixed by the case and the bottom plate, the hook is pivoted inside the case, the hook springs are disposed between the case and the inner side of the hook to constantly produce a force for pulling the inner side of the hook toward the bottom of the inner bin so that the inner side of the hook catches the hole on the outer bin, the trigger element is disposed between the case and the outer side of the hook and has a slant surface on the side toward the hook, and the pushing force from the slant surface makes the inner side of the hook retreat into the inner side of the inner bin, thereby releasing the connection between the inner and outer bins.

6. The improved structure of a shredder trash bin according to claim 1 with the bolt assembly including a hook, a hook spring, a trigger element, a bottom plate, and at least a trigger spring; wherein the outer bin is formed with a hole for the hook, the bolt assembly is fixed by the case and the bottom plate, the hook is pivoted between the bottom plate and the bottom surface of the inner bin, the hook springs are disposed between the bottom surface of the inner bin and the inner side of the hook to constantly produce a force for pulling the inner side of the hook toward the bottom of the inner bin so that the inner side of the hook catches the hole on the outer bin, the trigger element is pivotally disposed between the bottom plate and the bottom surface of the inner bin, toward the outer side of the hook to impose a pressure thereon for releasing the connection between the inner and outer bins, the trigger spring is disposed between the bottom plate and the trigger element to produce a force pushing the trigger element upward so that the bolt assembly returns back to the state that connects the inner and outer bins.

* * * * *